(12) United States Patent
Chedore et al.

(10) Patent No.: US 12,355,550 B2
(45) Date of Patent: *Jul. 8, 2025

(54) SCALABLE ADD/DROP COLORLESS, DIRECTIONLESS, AND CONTENTIONLESS OPTICAL ARCHITECTURES

(71) Applicant: Ciena Corporation, Hanover, MD (US)

(72) Inventors: Paul Chedore, Ottawa (CA); Jean-Luc Archambault, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,376

(22) Filed: Dec. 1, 2023

(65) Prior Publication Data

US 2024/0113798 A1 Apr. 4, 2024

Related U.S. Application Data

(63) Continuation of application No. 16/567,023, filed on Sep. 11, 2019, now Pat. No. 11,838,101, which is a
(Continued)

(51) Int. Cl.
*H04J 14/02* (2006.01)
*H04Q 11/00* (2006.01)

(52) U.S. Cl.
CPC .... *H04J 14/0204* (2013.01); *H04J 14/02126* (2023.08); *H04Q 11/0005* (2013.01);
(Continued)

(58) Field of Classification Search
CPC .............. H04J 14/0212; H04J 14/0204; H04Q 11/0005; H04Q 2011/0015; H04Q 2011/0016; H04Q 2011/0047
See application file for complete search history.

(56) References Cited

U.S. PATENT DOCUMENTS 6,281,997 B1 8/2001 Alexander et al.
6,407,863 B1 6/2002 Archambault et al.
(Continued)

OTHER PUBLICATIONS

Adams, Matthew, ROADM and Wavelength Selective Switches Perspectives for Fiber Optic Manufacturing Test Engineering, JDSU, White Paper, 2008, pp. 1-8.

*Primary Examiner* — Pranesh K Barua
(74) *Attorney, Agent, or Firm* — Baratta Law PLLC; Lawrence A. Baratta, Jr.

(57) ABSTRACT

A method for a scalable Reconfigurable Optical-Add Drop Multiplexer (ROADM) includes determining a plurality of channels at a ROADM node in an optical network will ingress and egress at another ROADM node in the optical network, such that the plurality of channels are able to share a same physical routing in the optical network; interfacing the plurality of channels at a degree in the ROADM node, such that the plurality of channels are connected to the another ROADM node in the optical network; adding and dropping the plurality of channels at the ROADM node with corresponding modems; and pre-combining the plurality of channels onto a common port between the degree and the corresponding modems, such that the plurality of channels connect to the degree together in a single connection. An add/channel count of the ROADM node is higher with the pre-combining.

18 Claims, 12 Drawing Sheets

Related U.S. Application Data continuation-in-part of application No. 15/881,420, filed on Jan. 26, 2018, now Pat. No. 10,454,609.

(52) U.S. Cl.
CPC .............. *H04Q 2011/0015* (2013.01); *H04Q 2011/0016* (2013.01); *H04Q 2011/0047* (2013.01)

(56) References Cited

U.S. PATENT DOCUMENTS

| | | | |
|---|---|---|---|
| 6,459,516 B1 | 10/2002 | Mizrahi et al. | |
| 6,567,196 B1 | 5/2003 | Archambault | |
| 7,231,107 B1 | 6/2007 | Zhong et al. | |
| 7,693,357 B2 | 4/2010 | Marrakchi El Fellah et al. | |
| 7,899,334 B2 | 3/2011 | Zhong et al. | |
| 8,457,497 B2 | 6/2013 | Zhong et al. | |
| 8,625,993 B2 | 1/2014 | Bhatnagar et al. | |
| 8,625,994 B2 | 1/2014 | Archambault et al. | |
| 8,774,632 B2 | 7/2014 | Archambault | |
| 9,680,569 B2 | 6/2017 | Archambault et al. | |
| 9,742,520 B1* | 8/2017 | Way | H04J 14/02122 |
| 2003/0016411 A1* | 1/2003 | Zhou | H04Q 11/0062 398/5 |
| 2005/0089027 A1* | 4/2005 | Colton | H04Q 11/005 370/380 |
| 2006/0098981 A1* | 5/2006 | Miura | H04J 14/0213 398/45 |
| 2007/0104491 A1* | 5/2007 | Hainberger | H04B 10/2942 398/175 |
| 2009/0041457 A1* | 2/2009 | Maki | H04Q 11/0062 398/45 |
| 2009/0324243 A1* | 12/2009 | Neilson | H04Q 11/005 398/154 |
| 2010/0129082 A1* | 5/2010 | Zhong | H04J 14/02126 398/83 |
| 2010/0202778 A1* | 8/2010 | Wisseman | H04J 14/0213 398/83 |
| 2010/0272441 A1* | 10/2010 | Boduch | H04J 14/02126 398/83 |
| 2011/0116790 A1* | 5/2011 | Sakauchi | H04J 14/0297 398/5 |
| 2011/0200324 A1* | 8/2011 | Boertjes | H04J 14/0212 398/16 |
| 2011/0262132 A1* | 10/2011 | Grindley | H04B 10/272 398/43 |
| 2012/0027408 A1* | 2/2012 | Atlas | H04J 14/022 398/58 |
| 2012/0128347 A1* | 5/2012 | Sakamoto | H04J 14/0213 398/48 |
| 2012/0183294 A1* | 7/2012 | Boertjes | H04J 14/0238 398/49 |
| 2013/0011136 A1* | 1/2013 | Hao | H04Q 11/0067 398/58 |
| 2013/0315580 A1* | 11/2013 | Boertjes | H04J 14/0204 398/5 |
| 2013/0330073 A1* | 12/2013 | Sakamoto | H04J 14/02216 398/38 |
| 2014/0126903 A1* | 5/2014 | Kaneoka | H04J 14/02122 398/48 |
| 2014/0147121 A1* | 5/2014 | Matsukawa | H04J 14/0217 398/83 |
| 2014/0270760 A1* | 9/2014 | Xu | H04J 14/0217 398/45 |
| 2015/0055952 A1* | 2/2015 | Younce | H04J 14/0217 398/83 |
| 2015/0086192 A1* | 3/2015 | Sakamoto | H04B 10/0771 398/16 |
| 2015/0208146 A1* | 7/2015 | Younce | H04B 10/071 398/21 |
| 2015/0256908 A1* | 9/2015 | Zhu | H04L 45/62 398/85 |
| 2015/0365186 A1* | 12/2015 | Schimpe | H04J 14/0213 398/50 |
| 2016/0036553 A1* | 2/2016 | Zhao | H04J 14/0297 398/7 |
| 2016/0057514 A1* | 2/2016 | Lord | H04J 14/0217 398/50 |
| 2016/0149664 A1* | 5/2016 | Wagener | H04J 14/0213 398/49 |
| 2016/0234574 A1* | 8/2016 | Wagener | H04Q 11/005 |
| 2016/0320562 A1* | 11/2016 | Komiya | H04J 14/0217 |
| 2016/0329678 A1* | 11/2016 | Huang | H01S 3/1302 |
| 2017/0279555 A1* | 9/2017 | Schimpe | H04J 14/02122 |
| 2018/0102866 A1* | 4/2018 | Younce | H04J 14/02122 |
| 2018/0288504 A1* | 10/2018 | Yang | H04Q 11/005 |

\* cited by examiner

SCALABLE ADD/DROP COLORLESS, DIRECTIONLESS, AND CONTENTIONLESS OPTICAL ARCHITECTURES

CROSS-REFERENCE TO RELATED APPLICATION(S)

The present disclosure is a continuation of U.S. patent application Ser. No. 16/567,023, filed Sep. 11, 2019, and entitled "Upgradeable colorless, directionless, and contentionless optical architectures," which is a continuation-in-part of U.S. patent application Ser. No. 15/881,420, filed Jan. 26, 2018, and entitled "Channel pre-combining in colorless, directionless, and contentionless optical architectures," which is now U.S. Pat. No. 10,454,609 which issued on Oct. 22, 2019, the contents of each are incorporated by reference.

FIELD OF THE DISCLOSURE

The present disclosure generally relates to optical networking systems and methods. More particularly, the present disclosure relates to systems and methods for scalable, upgradeable Colorless, Directionless, and Contentionless (CDC) optical architectures in Reconfigurable Optical Add-Drop Multiplexers (ROADMs).

BACKGROUND OF THE DISCLOSURE

Optical networks utilize Reconfigurable Optical Add-Drop Multiplexers (ROADMs) to realize selective and reconfigurable add/drop of wavelengths or spectrum locally and between various degrees. ROADMs generally utilize Wavelength Selective Switches (WSSs) in different configurations. Flexibility in add/drop requirements has led to so-called colorless, directionless, and optionally contentionless add/drop multiplexer structures, such as in Reconfigurable Optical Add/Drop Multiplexer (ROADM) devices, nodes, architectures, and structures. A colorless add/drop device supports any wavelength or spectral occupancy/band being added to any port of an add/drop device, i.e., ports are not wavelength specific. A directionless add/drop device supports any port being directed to any degree. Finally, a contentionless add/drop device supports multiple instances of the same channel (wavelength) in the same device. A colorless, directionless add/drop device can be referred to as a CD device, and a colorless, directionless, and contentionless add/drop device can be referred to as a CDC device. In conventional CD or CDC ROADMs, channels/modems are directly attached to the mux/demux element which usually is a Multicast Switch (MCS) but could also be a Contentionless WSS (CWSS).

Although CWSS technology will improve scaling by offering higher port count and lower insertion loss compared to conventional MCS technology, it does not go far enough in terms of improving scaling and cost/port metrics when compared to other colorless ROADM architectures such as CDA (Colorless Direct Attach—a colorless structure which is not directionless or contentionless) and CD. For example, in a 16-degree CDC ROADM node built using state-of-the-art 1×32 WSSs coupled to 16×24 CWSSs, the maximum number of channels of local add/drop channels would be 384 (which is 16×24). Assuming 64 channels per degree, the total number of channels present at the node could be as high as 1024, so add/drop capacity, in this case, is less than 40% (i.e., the node can only support 384 channels, much less than 1024 needed in this example). The only way to scale beyond this limit would be to go through a node expansion where a second layer of 1×32 WSSs is added to every degree, which is complex and costly. Additionally, the CD ROADM is generally lower cost on a per port basis.

Further, CDC deployments with CWSS modules are high cost. Specifically, there is an issue from a first cost perspective to support expansion of a ROADM node beyond eight degrees. Such an approach requires extremely high first-in cost such as in an example using 1×16×24 CWSS modules (FIG. 12). Another approach includes a modular, twin design such as in an example using two 2×8×24 CWSS modules (FIG. 13). The modular, twin design addresses the high first-in cost, but requires additional switches internal to the 2×8×24 CWSS modules that adds cost, complexity, and impacts performance.

Thus, there is a need for a CDC architecture that is scalable in terms of channel count for add/drop capacity and/or upgradeable in terms of degrees without high first-in costs, increased complexity, and decreased performance.

BRIEF SUMMARY OF THE DISCLOSURE

CDC architectures are growing increasingly popular with service providers. This due to the fact it offers the greatest operational simplicity and the highest probability of achieving maximum restoration when recovering from a fault. However, the CDC architecture does have shortcomings relative to other architectures such as a CD architecture such as the CDC architecture is appreciably more expensive on a cost per port basis and CDC does not scale well due to the relatively low number of add/drop channels it accommodates per consumed line WSS port. As the CDC ROADM architecture with the CWSS is expected to proliferate, there is a need to expand the add/drop capacity and improve the cost per port.

In an embodiment, a method includes determining a plurality of channels at a Reconfigurable Optical-Add Drop Multiplexer (ROADM) node in an optical network will ingress and egress at another ROADM node in the optical network, such that the plurality of channels are able to share a same physical routing in the optical network; interfacing the plurality of channels at a degree in the ROADM node, such that the plurality of channels are connected to the another ROADM node in the optical network; adding and dropping the plurality of channels at the ROADM node from and to corresponding modems; and pre-combining the plurality of channels onto a common port between the degree and the corresponding modems, such that the plurality of channels connect to the degree together in a single connection. An add/channel count of the ROADM node is higher with the pre-combining than without performing the pre-combining.

The plurality of channels are co-routed in the optical network, following a same path as one another, and being added and dropped together at the another ROADM node. At least two of the plurality of channels can be non-adjacent to one another in optical spectrum. Alternatively, the plurality of channels are adjacent to one another in optical spectrum. The ROADM can include a Colorless, Directionless, and Contentionless (CDC) architecture. The ROADM can include one or more Contentionless Wavelength Selective Switches (CWSS). The method can include amplifying the plurality of channels after the pre-combining. The plurality of channels can include C channels, C being an integer greater than or equal to 4. The ROADM includes one or more degrees including the degree, and wherein the method can include upgrading the ROADM in-service to include one or more additional degrees with one or more degrees.

In another embodiment, a Reconfigurable Optical Add/Drop Multiplexer (ROADM) node includes one or more degrees, including a degree configured to connect to another ROADM node in an optical network; a plurality of optical modems each configured to add and drop a channel at the ROADM node; and one or more pre-combiners located in-between the degree and the one or more optical modems, wherein, subsequent to a determination that a plurality of channels will ingress and egress at another ROADM node in the optical network, such that the plurality of channels are able to a same physical routing in the optical network, corresponding optical modems of the plurality of optical modems are connected to a pre-combiner of the one or more pre-combiners, such that the plurality of channels connect to the degree together in a single connection. An add/channel count of the ROADM node is higher with the one or more pre-combiners than without the one or more pre-combiners.

The plurality of channels are co-routed in the optical network, following a same path as one another, and being added and dropped together at the another ROADM node. At least two of the plurality of channels can be non-adjacent to one another in optical spectrum. Alternatively, the plurality of channels can be adjacent to one another in optical spectrum. The ROADM can include a Colorless, Directionless, and Contentionless (CDC) architecture. The degree can include one or more Contentionless Wavelength Selective Switches (CWSS). The ROADM node can further include an amplifier configured to amplifier the plurality of channels after the pre-combiner. The plurality of channels can include C channels, C being an integer greater than or equal to 4. The one or more degrees can be upgradeable in-service to include one or more additional degrees with one or more degrees.

In an embodiment, a pre-combiner apparatus in a Colorless, Directionless, and Contentionless (CDC) architecture includes one or more channel pre-combiners each having a common port with a transmit port and a receiver port, at least two local add/drop ports, and components configured to combine channels between the at least two local add/drop ports and the common port; and splitters and combiners each connected to the corresponding common ports of the one or more channel pre-combiners. Each of the splitters are connected to the corresponding transmit ports and each of the combiners are connected to the corresponding receive ports. The pre-combiner apparatus can further include a transmit amplifier prior to each splitter; and a receive amplifier subsequent to each combiner.

Each of the splitters and the combiners can include two ports with a first port configured to connect to a first Contentionless Wavelength Selective Switch (CWSS)-based optical add/drop device and a second port configured to connect to a second CWSS-based optical device. The first CWSS-based optical add/drop device can be added to support up to M degrees, and wherein the second CWSS-based optical add/drop device can be added to support up to M+M degrees, M is an integer. Each of the first CWSS-based optical add/drop device and the second CWSS-based optical add/drop device can include an M-array of 1×N Wavelength Selective Switches (WSSs) and an N-array of M×1 switches. The combiners can be configured to broadcast the channels to the first CWSS-based optical add/drop device and the second CWSS-based optical add/drop device for selection, and the splitters can be configured to broadcast the channels to both of the first CWSS-based optical add/drop device and the second CWSS-based optical add/drop device.

In another embodiment, a modular optical add/drop system supporting a Colorless, Directionless, and Contentionless (CDC) architecture includes a first Contentionless Wavelength Selective Switch (CWSS)-based optical add/drop device; and one or more channel pre-combiners each having a common port with a transmit port and a receiver port, at least two local add/drop ports, components configured to combine channels between the at least two local add/drop ports and the common port, and a splitter and a combiner connected to the common port, wherein a first output of the splitter and the combiner is connected to the first CWSS-based optical add/drop device. The splitter is connected to the transmit port and the combiner is connected to the receive port. The one or more channel pre-combiners can further include a transmit amplifier prior to the splitter, and a receive amplifier subsequent to the combiner.

The modular optical add/drop system can further include a second CWSS-based optical add/drop device, wherein a second output of the splitter and the combiner is connected to the second CWSS-based optical add/drop device. The first CWSS-based optical add/drop device can be added to support up to M degrees, and wherein the second CWSS-based optical add/drop device can be added to support up to M+M degrees, M is an integer. Each of the first CWSS-based optical add/drop device and the second CWSS-based optical add/drop device can include an M-array of 1×N Wavelength Selective Switches (WSSs) and an N-array of M×1 switches. The combiner can be configured to broadcast the channels to the first CWSS-based optical add/drop device and the second CWSS-based optical add/drop device for selection, and the splitter can be configured to broadcast the channels to both of the first CWSS-based optical add/drop device and the second CWSS-based optical add/drop device.

In a further embodiment, a Reconfigurable Optical Add/Drop Multiplexer (ROADM) node supporting a Colorless, Directionless, and Contentionless (CDC) architecture includes one or more Contentionless Wavelength Selective Switch (CWSS)-based optical add/drop devices; and a plurality of channel pre-combiners each having a common port with a transmit port and a receiver port, at least two local add/drop ports, components configured to combine channels between the at least two local add/drop ports and the common port, and a splitter and a combiner connected to the common port, wherein a first output of the splitter and the combiner is connected to a first CWSS-based optical add/drop device of the one or more CWSS-based optical add/drop devices. Each of the plurality of channel pre-combiners can further include a transmit amplifier prior to the splitter, and a receive amplifier subsequent to the combiner.

A second output of the splitter and the combiner can be connected to a second CWSS-based optical add/drop device of the one or more CWSS-based optical add/drop devices. The first CWSS-based optical add/drop device can be added to support up to M degrees, and wherein the second CWSS-based optical add/drop device can be added to support up to M+M degrees, M is an integer. Each of the first CWSS-based optical add/drop device and the second CWSS-based optical add/drop device can include an M-array of 1×N Wavelength Selective Switches (WSSs) and an N-array of M×1 switches. The combiner is configured to broadcast the channels to the first CWSS-based optical add/drop device and the second CWSS-based optical add/drop device for selection, and the splitter is configured to broadcast the channels to both of the first CWSS-based optical add/drop device and the second CWSS-based optical add/drop device.

In a further embodiment, an optical add/drop system supporting a Colorless, Directionless, and Contentionless (CDC) architecture includes a Contentionless Wavelength Selective Switch (CWSS)-based optical add/drop device including N local add/drop ports and M degree ports, wherein the CWSS-based optical add/drop device includes an M-array of 1×N Wavelength Selective Switches (WSSs) and an N-array of M×1 switches; and a first channel pre-combiner including a common port connected to a first port of the N local add/drop ports and at least two local add/drop ports of the first channel pre-combiner coupled to the common port, wherein the first channel pre-combiner further includes amplifiers on the common port in both an add direction and a drop direction, wherein the CWSS-based optical add/drop device is configured to filter out-of-band noise in the add direction from the amplifiers on the common port in the add direction utilizing a corresponding port of the M-array of 1×N WSSs as an integrated, built-in filter in the CWSS-based optical add/drop where there are no intermediate devices between the amplifier on the common port in the add direction and the CWSS-based optical add/drop for filtering.

The at least two local add/drop ports can be connected to associated optical modems each of which has channels which are co-routed to a same degree by the CWSS-based optical add/drop device. The associated optical modems can provide associated channels at non-adjacent spectral locations to one another. The CWSS-based optical add/drop device can include amplifiers located after a multiplexer of the M degree ports. An optical modem can be directly attached to a second port of the CWSS-based optical add/drop device. The optical add/drop system can further include a second channel pre-combiner including a common port connected to a second port of the N local add/drop ports and at least two local add/drop ports coupled to the common port. The first channel pre-combiner can have a different number of local add/drop ports from the second channel pre-combiner.

In a further embodiment, a Reconfigurable Optical Add/Drop Multiplexer (ROADM) node supporting a Colorless, Directionless, and Contentionless (CDC) architecture includes one or more Contentionless Wavelength Selective Switch (CWSS)-based optical add/drop devices each including N local add/drop ports and M degree ports, wherein the CWSS-based optical add/drop device includes an M-array of 1×N Wavelength Selective Switches (WSSs) and an N-array of M×1 switches; and a plurality of channel pre-combiners each including a common port connected to an associated port of the N local add/drop ports and at least two local add/drop ports of each of the plurality of channel pre-combiners coupled to the common port, wherein one or more of the plurality of channel pre-combiners include amplifiers on the common port in both an add direction and a drop direction, wherein a corresponding CWSS-based optical add/drop device is configured to filter out-of-band noise in the add direction from the amplifiers on the common port in the add direction utilizing a corresponding port of the M-array of 1×N WSSs as an integrated, built-in filter in the CWSS-based optical add/drop where there are no intermediate devices between the amplifier on the common port in the add direction and the CWSS-based optical add/drop for filtering.

The at least two local add/drop ports on each of the plurality of channel pre-combiners can be connected to associated optical modems each of which has channels which are co-routed to a same degree by the associated CWSS-based optical add/drop device. Each of the one or more CWSS-based optical add/drop devices can include amplifiers located after a multiplexer of the M degree ports. An optical modem can be directly attached to a second port of one of the one or more CWSS-based optical add/drop devices. The plurality of channel pre-combiners can include a first channel pre-combiner and a second channel pre-combiner each coupled to a CWSS-based optical add/drop device, wherein each of the first channel pre-combiner and the second channel pre-combiner have a different number of local add/drop ports.

In another further embodiment, a method for an optical add/drop system supporting a Colorless, Directionless, and Contentionless (CDC) architecture includes providing a Contentionless Wavelength Selective Switch (CWSS)-based optical add/drop device including N local add/drop ports and M degree ports, wherein the CWSS-based optical add/drop device includes an M-array of 1×N Wavelength Selective Switches (WSSs) and an N-array of M×1 switches; and providing a first channel pre-combiner including a common port connected to a first port of the N local add/drop ports and at least two local add/drop ports of the first channel pre-combiner coupled to the common port, wherein the first channel pre-combiner further includes amplifiers on the common port in both an add direction and a drop direction, wherein the CWSS-based optical add/drop device is configured to filter out-of-band noise in the add direction from the amplifiers on the common port in the add direction utilizing a corresponding port of the M-array of 1×N WSSs as an integrated, built-in filter in the CWSS-based optical add/drop where there are no intermediate devices between the amplifier on the common port in the add direction and the CWSS-based optical add/drop for filtering.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for channel pre-combining in Colorless, Directionless, and Contentionless (CDC) optical architectures. Also, the systems and methods relate to upgradeable CDC optical architectures, leveraging the channel pre-combining. Specifically, the systems and methods include channel pre-combining with Contentionless WSS (CWSS) devices for local add/drop in a CDC architecture. Various physical implementations are presented including passive pre-combining modules, amplified pre-combining modules, etc. The systems and method significantly improve the cost per port (or cost per 100 GHz of spectrum in terms of flexible grid spectrum) and scaling relative to conventional CDC add/drop structures and CD add/drop structures. Pre-combined channels in the CDC architecture require the same physical routing in the network (i.e., A-Z connectivity), but offer improved cost and scaling at the expense of this routing constraint. Note, despite the pre-combined channels requiring the same physical routing, each of the pre-combined channels can be at any spectral location including non-adjacent to one another, i.e., the constraint is only that the pre-combined channels have the same ingress and egress node without spectral limitations.

The upgradeable CDC optical architectures utilize a splitter on a channel pre-combiner to interface signals to two CWSS modules. A first CWSS module can support up to eight degrees whereas a second CWSS module can support degrees 9-16. The splitter on the channel pre-combiner has relatively low cost and impact and allows a network operator to start a CDC deployment with a CWSS device only supporting up to 8 degrees. The CDC deployment can scale beyond the 8 degrees with the second CWSS device at a later date and with connectivity via the splitters on the channel pre-combiner. The benefit of adding this feature to the channel pre-combiner is the minimal effect on the pre-combiner cost or performance while allowing customers to future proof their node for scaling beyond 8 degrees.

Figure 1:
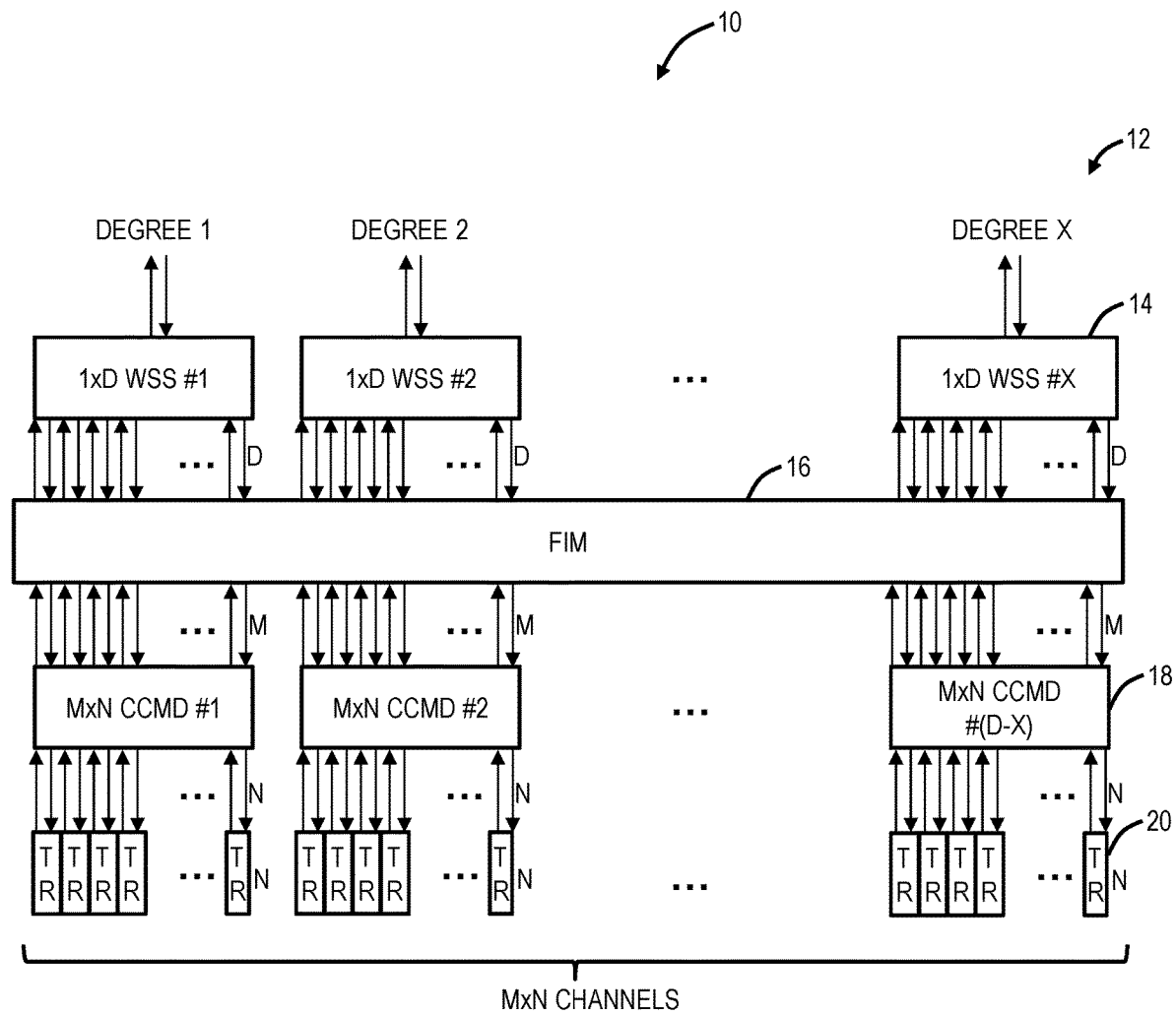
FIG. 1 is a block diagram of a Reconfigurable Optical Add-Drop Multiplexer (ROADM) node with a colorless, directionless, and contentionless (CDC) optical architecture.

FIG. 1 is a block diagram of a Reconfigurable Optical Add-Drop Multiplexer (ROADM) node 10 with a CDC optical architecture. The ROADM node 10 is part of an optical network and is responsible for local add/drop channels and node bypass. The ROADM node 10 includes a number of degrees 12 equal to X, X is an integer. The degrees 12 are input/output connectivity between the ROADM node 10 and other nodes in an optical network. In this example, the ROADM node 10 can connect to X adjacent nodes in the optical network. For illustration clarity, FIG. 1 shows bidirectional connectivity. Thus, each of the degrees 12 have a transmit (TX) and receive (RX) fiber. Also, those skilled in the art will recognize the ROADM node 10 can include various other components such as pre/post amplifiers, Optical Channel Monitors (OCMs), Optical Service Channels (OSCs), and the like which are omitted for illustration purposes.

Each degree 12 includes a 1×D WSS 14, labeled as 1×D WSS #1, #2, . . . , #X. Each 1×D WSS 14 connects to a Fiber Interface Module (FIM) 16 which is a passive fiber connection device, e.g., a patch panel. The objective of the FIM 16 is to optically connect the various devices in the ROADM node 10. The FIM 16 is configured to interconnect the 1×D WSS 14 to one another enabling nodal bypass of channels. The FIM 16 is further configured to interconnect each 1×D WSS 14 to a M×N Colorless Channel Multiplexer/Demultiplexer (CCMD) 18, N and M are integers. The FIM 16 can be a passive module utilizing various dense fiber packaging techniques to minimize cabling and fiber routing, such as MPO/APC connectors.

Figure 3:
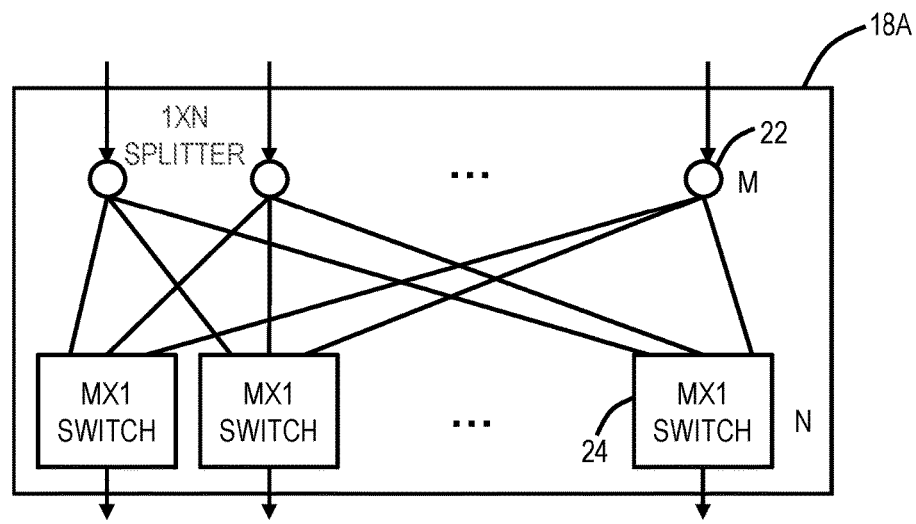
FIG. 3 is a block diagram of an implementation of a CCMD utilizing Multicast Switches (MCS)
Figure 4:
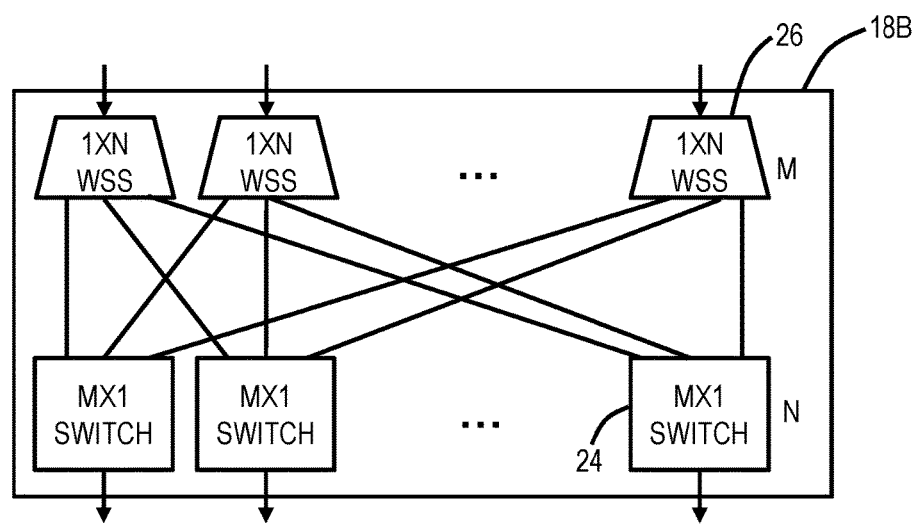
FIG. 4 is a block diagram of an implementation of a CCMD utilizing Contentionless Wavelength Selective Switches (CWSS)

The ROADM node 10 includes the M×N CCMD 18, labeled as M×N CCMD #1, #2, . . . , #(D-X), for local add/drop of channels in a colorless, directionless, and contentionless manner. The number of degrees, X, can be any value between 1 and M. The ROADM node 10 includes up to D-X M×N CCMDs 18. The M×N CCMD is an optical add/drop device that supports M degrees and N channels (optical modems). The M×N CCMDs 18 can be implemented using Multicast Switches (MCS) or Contentionless WSS (CWSS), and additional detail of the M×N CCMDs 18 is shown in FIGS. 3 and 4. The M×N CCMDs 18 are optical add/drop devices that generally include optical amplifiers, Multicast Optical Switches (MCS), etc. and are configured to support colorless multiplexing/demultiplexing in the ROADM node 10. The M×N CCMDs 18 are directionless meaning any channel can be sent to any degree and contentionless as well, supporting more than one instance of a specific channel in the same M×N CCMD 18. Each of the M×N CCMDs 18 is connected to up to N optical modems 20. To support directionless operation, each of the M×N CCMDs 18 is connected to each of the 1×D WSSs 14, such as via the FIM 16.

Those of ordinary skill in the art will recognize other configurations are also possible to support a CDC architecture at the ROADM node 10. Further, the selection of X, D, N, and M are implementation specific, and various values are contemplated. The selection of these values is generally a function of component availability, insertion loss, performance, etc.

Figure 2:
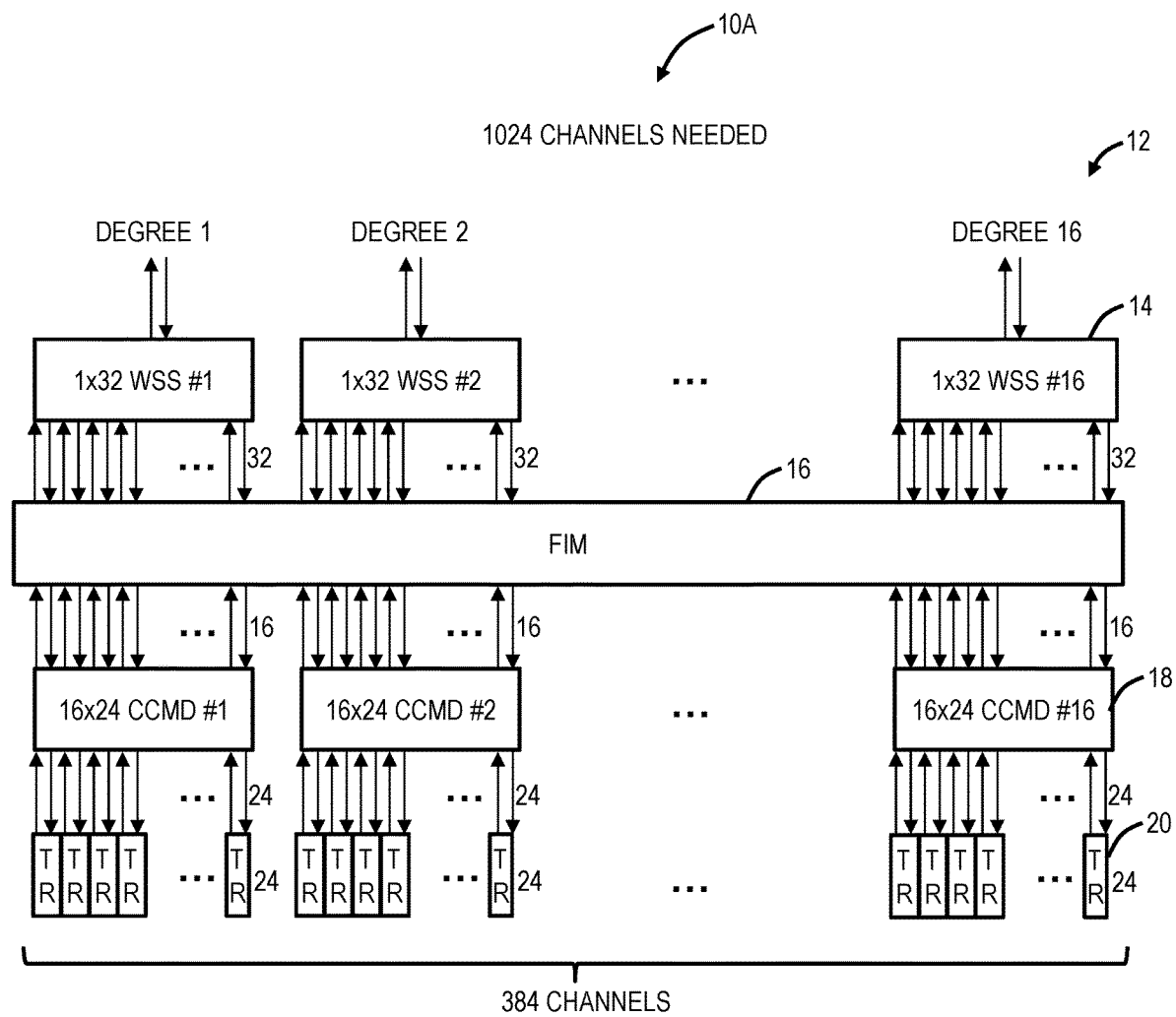
FIG. 2 is a block diagram of an example ROADM node with the CDC optical architecture and with 1×32 WSSs and 16×24 Colorless Channel Multiplexer/Demultiplexer (CCMD) to illustrate the per port scaling and cost issues.

FIG. 2 is a block diagram of an example ROADM node 10A with the CDC optical architecture and with 1×32 WSSs and 16×24 CCMDs to illustrate the per port scaling and cost issues. Specifically, in this example ROADM node 10A, X=16, D=32, M=16, and N=24. This is a 16-degree CDC ROADM node 10A built using state-of-the-art 1×32 WSSs 14 coupled to 16×24 CWSSs for the CCMDs 18. As described herein, the maximum number of channels of local add/drop channels would be 384 (which is 16 CCMDs times 24 optical modems). Thus, the 16-degree CDC ROADM node 10A can only support 384 total channels which means the ROADM node 10A can only add/drop 24 channels per degree. Further, the number of degrees can be reduced which can further increase the number of CCMDs 18 which can connect. Of note, optical systems can include significantly more channels, e.g., 88 channels total per degree. In the previous example described herein, the assumption was 64 channels per degree, the total number of channels present at the ROADM node 10A could be as high as 1024, so add/drop capacity in this case is less than 40% (i.e., the node can only support 384 channels, much less than 1024 needed in this example). The only way to scale beyond this limit would be to go through a node expansion where a second layer of 1×32 WSSs is added to every degree, which is complex and costly. By contrast, a CD ROADM using similar high port count WSSs would be able to achieve 100% add/drop capacity without the need for node expansion for the port count but could require additional CCMDs and/or layers of WSSs to support the same wavelengths on different degrees, i.e., since the CD ROADM is not contentionless.

FIG. 3 is a block diagram of an implementation of a Colorless Channel Multiplexer/Demultiplexer (CCMD) 18A utilizing Multicast Switches (MCS). FIG. 4 is a block diagram of an implementation of a CCMD 18B utilizing Contentionless Wavelength Selective Switches (CWSS). Both the CCMDs 18A, 18B are M×N devices supporting connectivity to M degrees and N channels/ports per device. The CCMD 18A includes an M-array of 1×N splitters/combiners 22, and an N-array of M×1 switches 24. The CCMD 18B includes an M-array of 1×N WSSs 26 and an N-array of M×1 switches 24. Thus the CCMD 18B is a CWSS-based M×N CCMD (optical add/drop device). On the channel side (facing the optical modems 20), both the CCMDs 18A, 18B utilize the M×1 switches 24 to direct a given channel/wavelength to a specific degree. The fundamental difference is that an MCS (CCMD 18A) uses a combiner to multiplex the channel ports whereas the Contentionless WSS uses a WSS.

For the MCS (CCMD 18A), when channels are multiplexed with a combiner, the out-of-band Amplified Spontaneous Emission (ASE) from all those channels add up (i.e., noise funneling). This is mitigated in newer optical modems by adding tunable filters at the output to remove the out-of-band ASE. This is because higher order modulation formats cannot afford the Optical Signal-to-Noise Ratio (OSNR) penalty from noise funneling.

The systems and methods described herein utilize the CWSS (CCMD 18B) with pre-combining of channels to improve channel/port scaling and cost. Conventional CDC architectures generally use the MCS (CCMD 18A), and it is expected that next-generation CDC architectures will move predominantly towards the CWSS (CCMD 18B) approach. Advantageously, the CWSS has a significantly lower loss (e.g., about 7 dB for a 1×32 WSS versus 13 dB for a 1×16 splitter), the potential to scale to higher port counts (than the MCS implementation) and channel filtering is built-in in the multiplexing direction to reduce noise funneling. The systems and methods herein address one of the adoption challenges for the CWSS in CDC architectures, namely port scaling and cost per port.

The CWSS requires two switching elements, namely the M-array of 1×N WSS 26 and the N-array of 1×M switches 24 (whereas the MCS has a single switching element with combiners/splitters). The M-array of 1×N WSS 26 can be realized with a single Liquid Crystal on Silicon (LCoS) chip, and each WSS 26 creates different diffraction angles for individual channels pointing at any of the N channel ports. The N-array of 1×M switches 24 can be realized with a Microelectromechanical system (MEMS) mirror array (a Planar Lightwave Circuit (PLC) design also possible) and is configured to point a particular channel port to one of the M-array of 1×N WSS 26.

Figure 5:
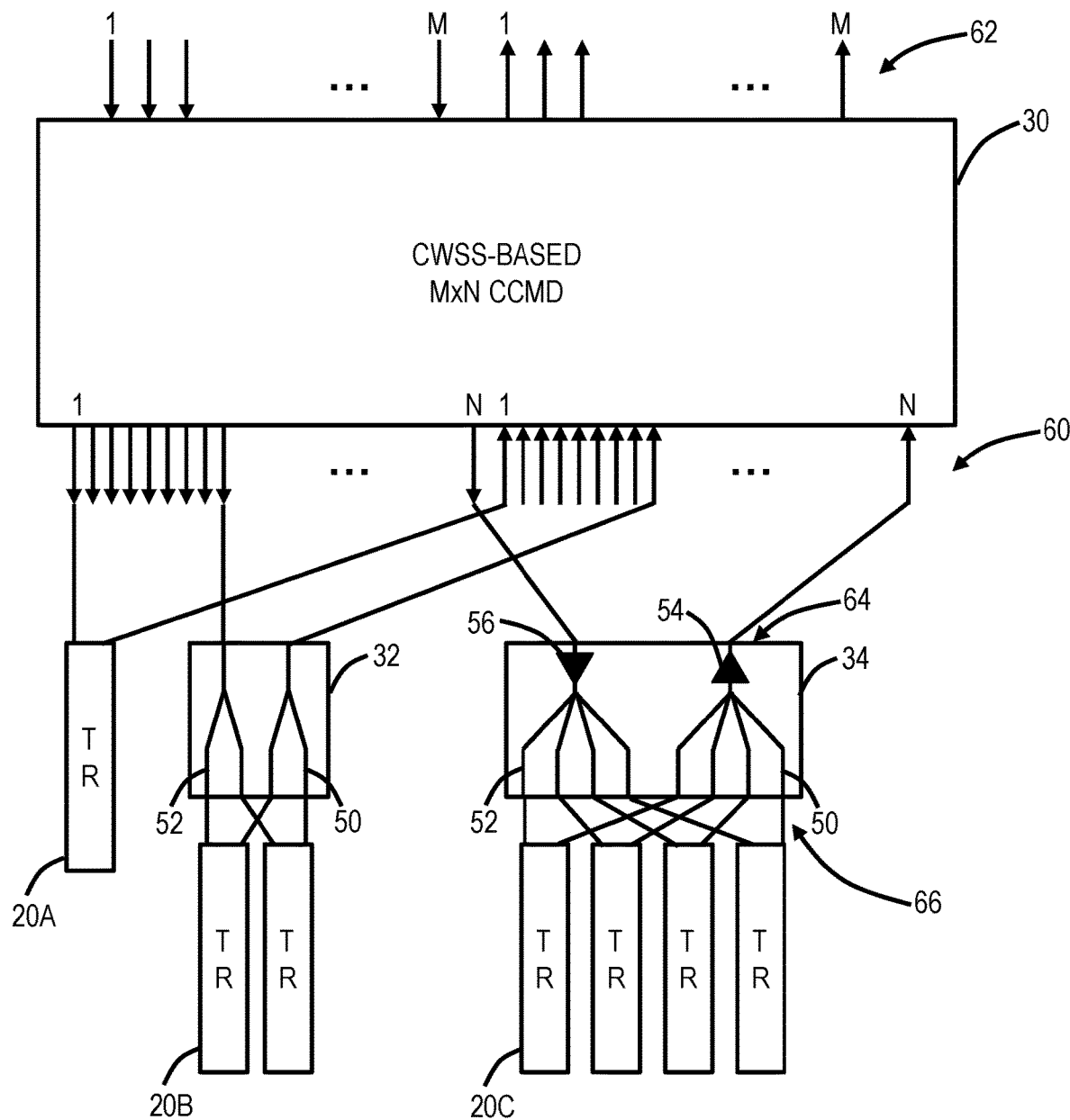
FIG. 5 is a block diagram of a CWSS-based M×N CCMD with channel pre-combiners.
Figure 6:
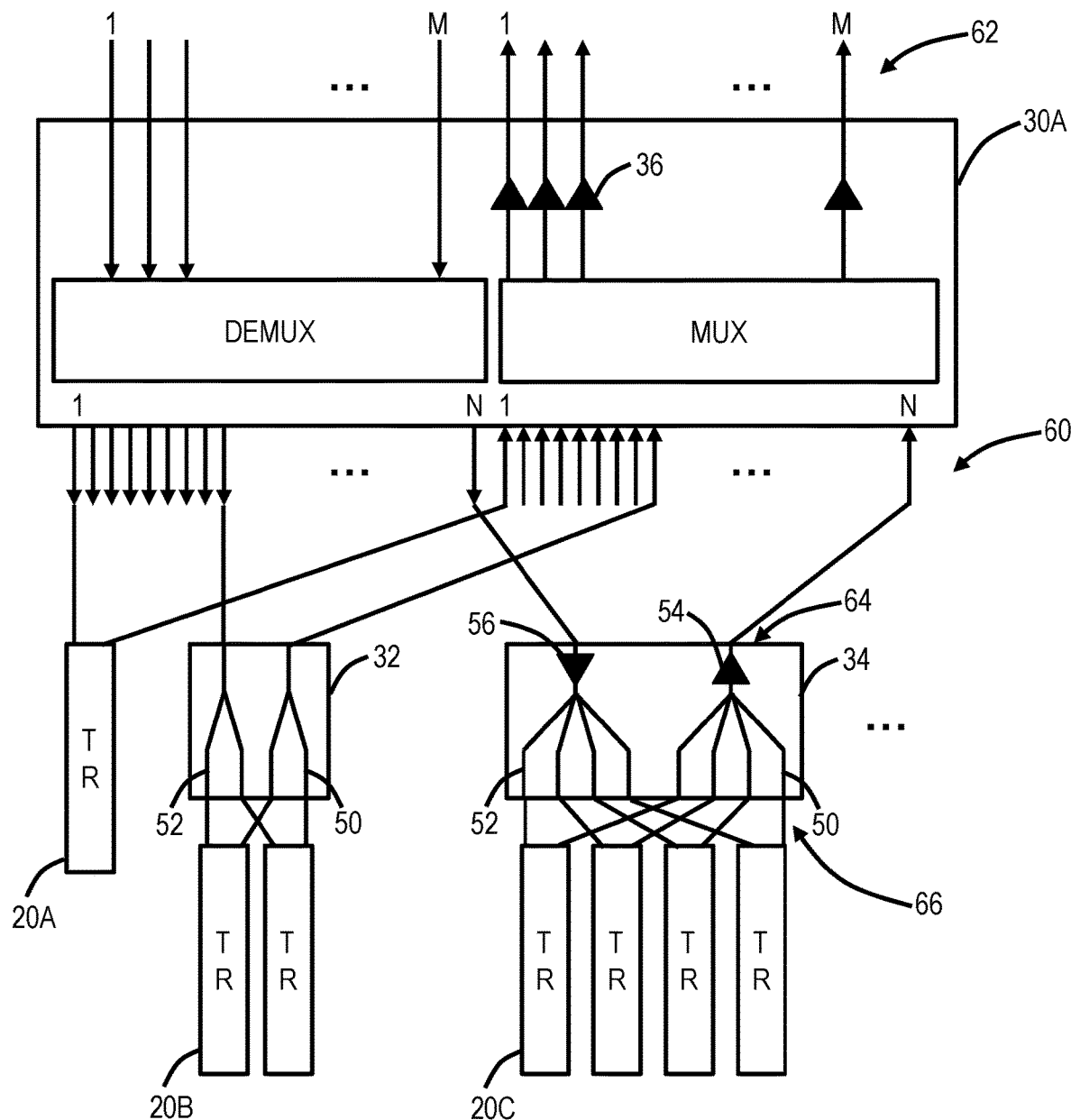
FIG. 6 is a block diagram of a CWSS-based M×N CCMD with multiplexer side amplifiers and with the channel pre-combiners.
Figure 7:
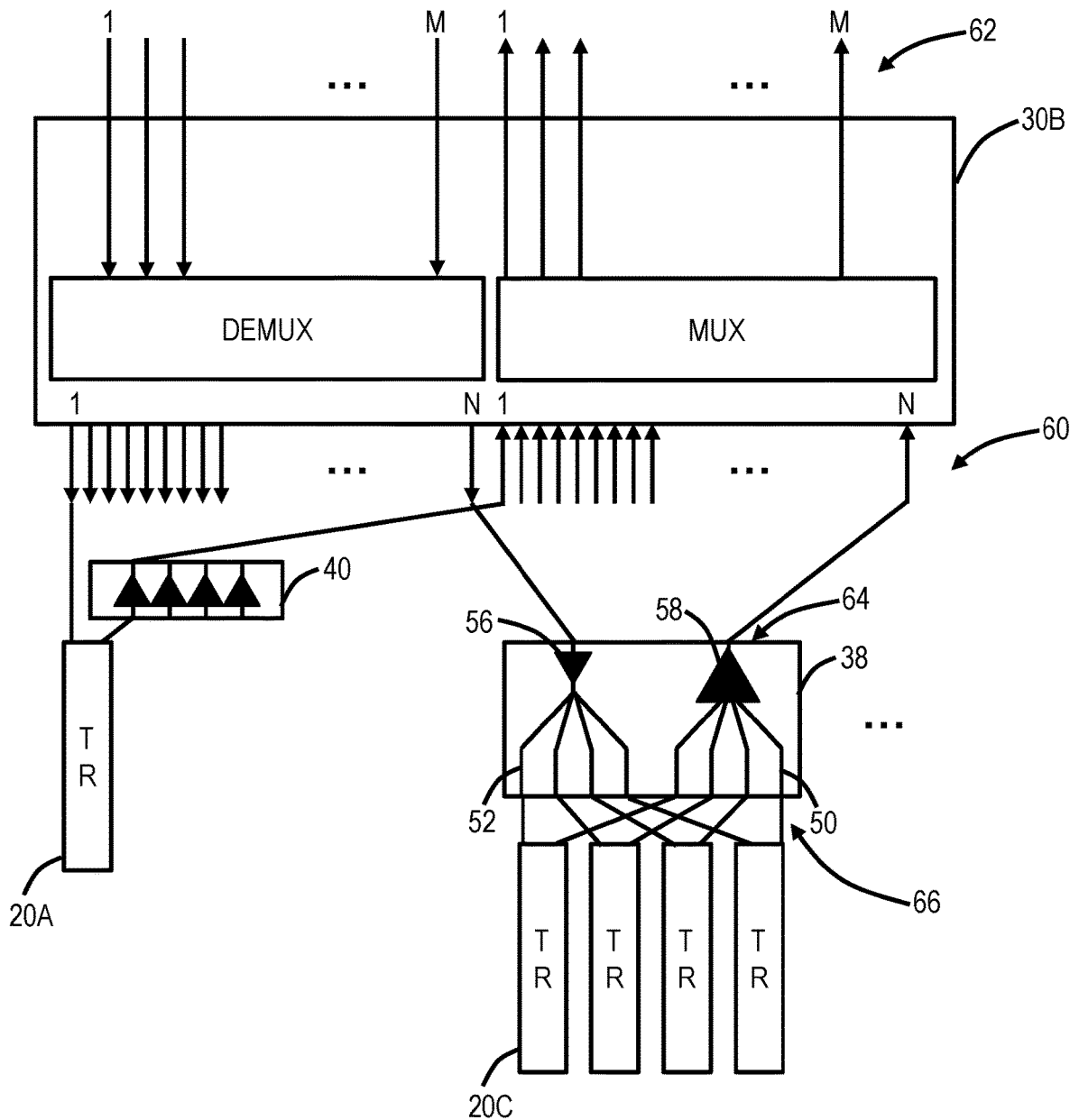
FIG. 7 is a block diagram of a CWSS-based M×N CCMD without amplifiers therein and with a channel pre-combiner and with a channel amplifier.
Figure 8:
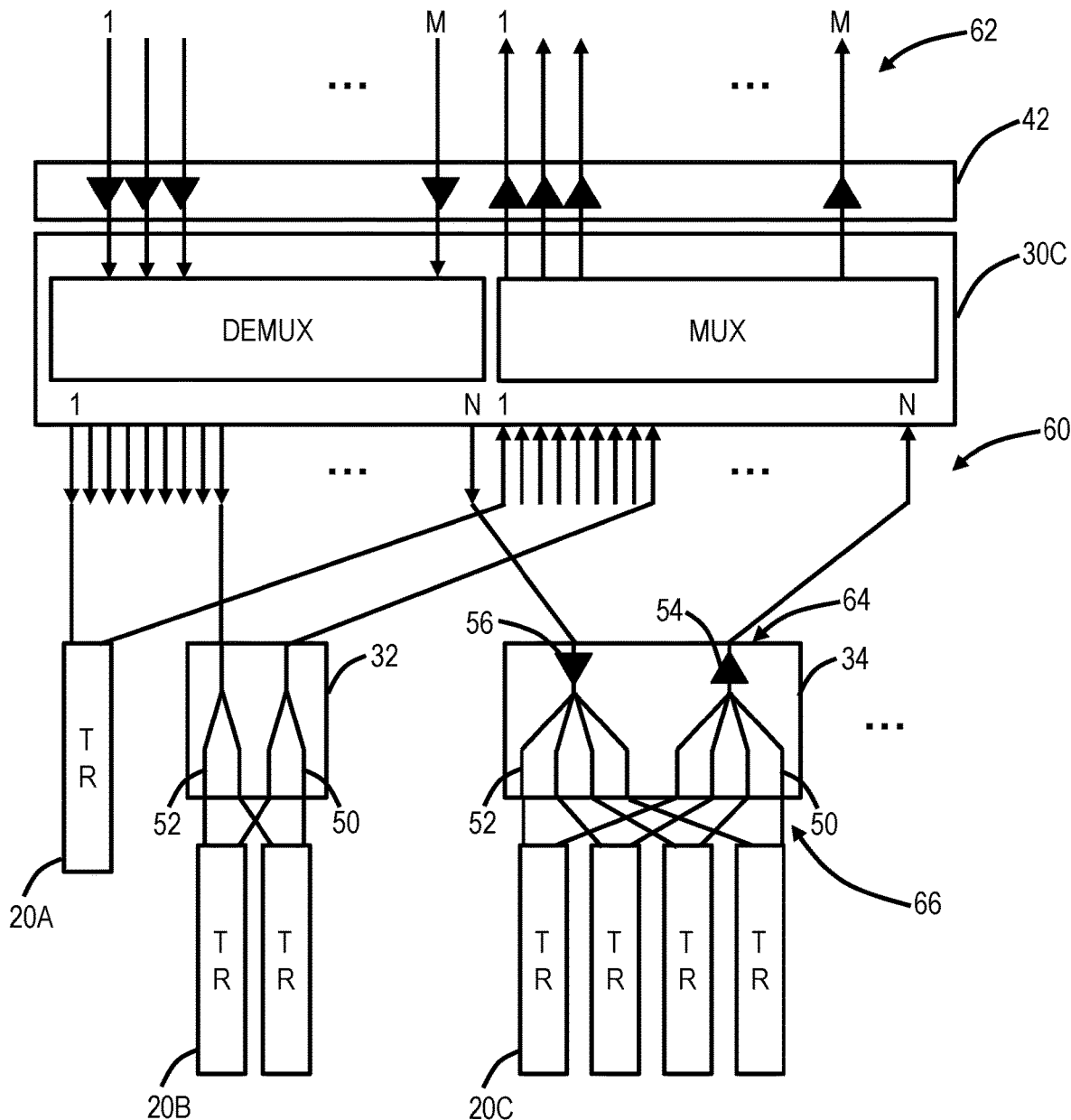
FIG. 8 is a block diagram of a CWSS-based M×N CCMD without amplifiers therein, a degree side amplifier module on all ports, and with the channel pre-combiners.
Figure 9:
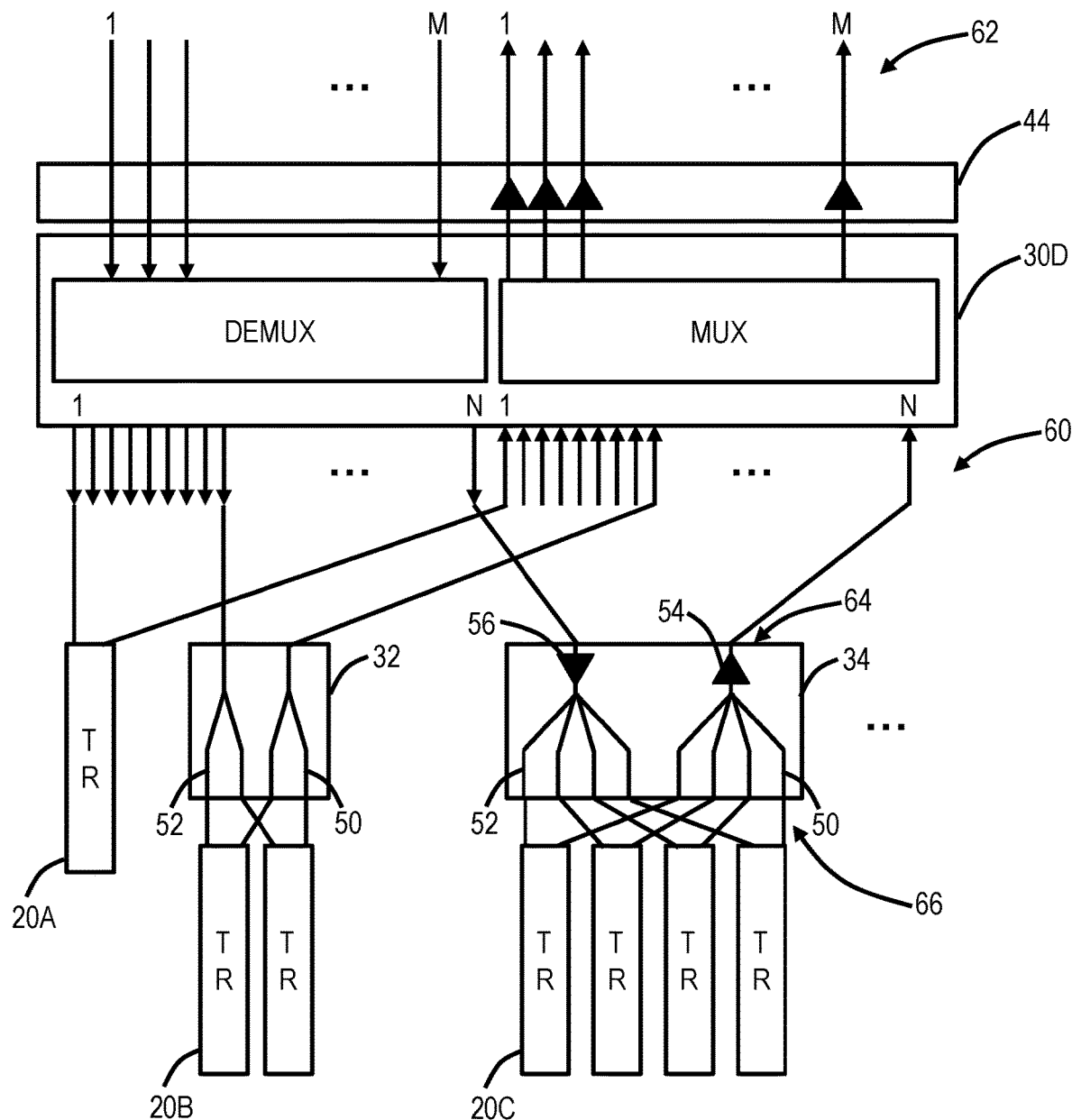
FIG. 9 is a block diagram of a CWSS-based M×N CCMD without amplifiers therein, a degree side amplifier module on multiplexer ports, and with the channel pre-combiners.
Figure 10:
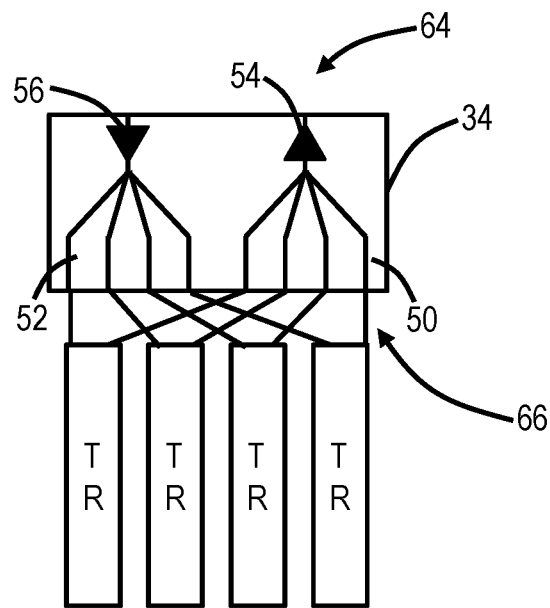
FIG. 10 is a block diagram of different variants of the channel pre-combiners.
Figure 10:
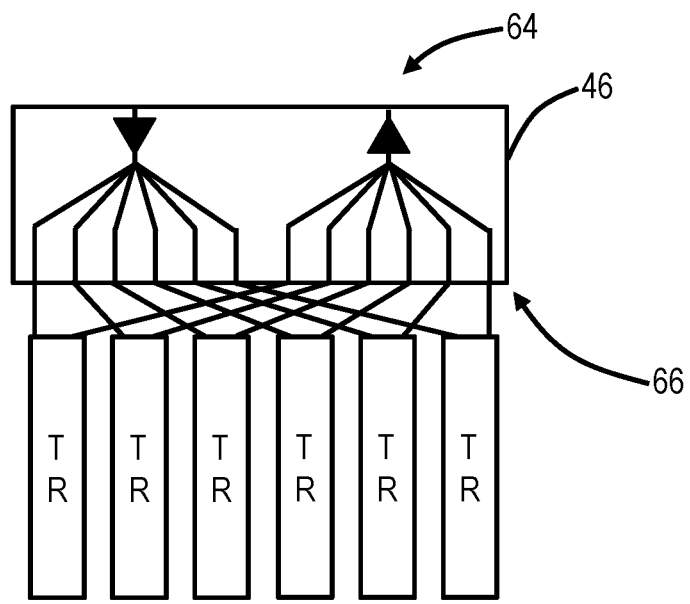
Figure 11:
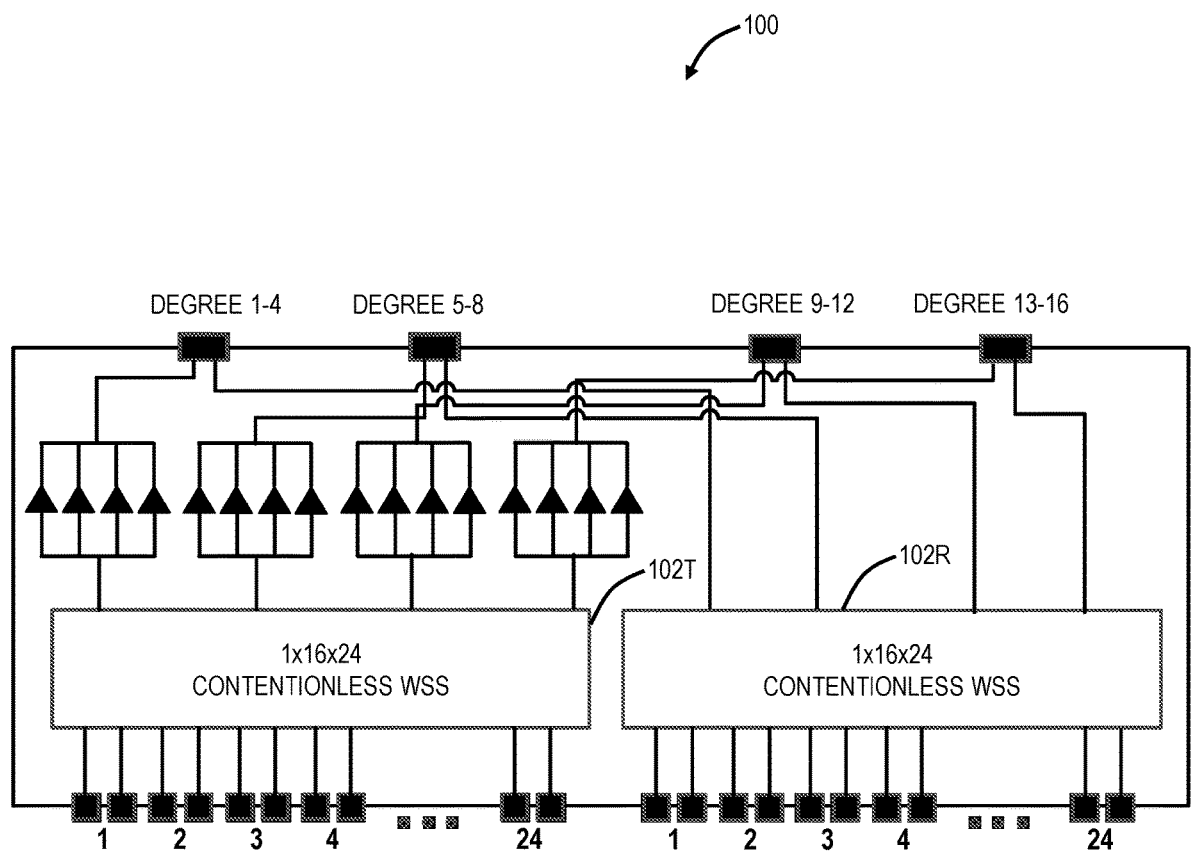
FIG. 11 is a block diagram of an example implementation of an optical add/drop system with a CDC architecture and with the ability to support 16 degrees.

FIG. 5 is a block diagram of a CWSS-based M×N CCMD 30 with channel pre-combiners 32, 34. FIG. 6 is a block diagram of a CWSS-based M×N CCMD 30A with multiplexer side amplifiers 36 and with the channel pre-combiners 32, 34. FIG. 7 is a block diagram of a CWSS-based M×N CCMD 30B without amplifiers therein and with a channel pre-combiner 38 and with a channel amplifier 40. FIG. 8 is a block diagram of a CWSS-based M×N CCMD 30C without amplifiers therein, a degree side amplifier module 42 on all ports, and with the channel pre-combiners 32, 34. FIG. 9 is a block diagram of a CWSS-based M×N CCMD 30D without amplifiers therein, a degree side amplifier module 44 on multiplexer ports, and with the channel pre-combiners 32, 34. FIG. 10 is a block diagram of different variants of the channel pre-combiners 34, 46.

Again, the systems and methods utilize both the CWSS-based M×N CCMD 30 and the channel pre-combiners 32, 34, 38, 46 to significantly mitigate the limitations of the CDC architecture by pre-combining channels being added through the CDC ROADM, thus allowing the multiplication of channels per port when they are co-routed (originate and terminate at the same nodes). This is particularly effective when the CDC ROADM structure includes the CWSS for routing add/drop channels to different ROADM degrees as the CWSS largely eliminates the ASE noise funneling that would occur if the MCS approach is used.

FIG. 5 illustrates three approaches for channel add/drop with the CWSS-based M×N CCMD 30, namely a direct connection with an optical modem 20A, a passive combination of two optical modems 20B with a passive pre-combiner 32, and an amplified combination of four optical modems 20C with an amplified pre-combiner 34. The optical modem 20A directly connects to the CWSS-based M×N CCMD 30. Thus one of the N ports of the CWSS-based M×N CCMD 30 is used for a single channel. The channel pre-combiners 32, 34 connect in a similar manner as the optical modem 20A, each taking up a port of the N ports of the CWSS-based M×N CCMD 30, but the channel pre-combiners 32, 34 have multiple ports on an add/drop side. In this example, the passive pre-combiner 32 has two ports, thus it operates as to double the port it connects to on the CWSS-based M×N CCMD 30. The amplified pre-combiner 34 has four ports, thus it operates to quadruple the port it connects to on the CWSS-based M×N CCMD 30.

The channel pre-combiners 32, 34, 38, 46 include couplers 50 in the transmit direction to combine the channels from the optical modems 20B, 20C before they are coupled to the CWSS-based M×N CCMD 30. The channel pre-combiners 32, 34, 38, 46 include splitters 52 in the receive direction to split the channels to the optical modems 20B, 20C from the CWSS-based M×N CCMD 30. The channel pre-combiners 34, 38, 46 can also include an amplifier 54 in the transmit direction and an amplifier 56 in the receive direction. The channel pre-combiner 38 can include a higher power amplifier 58 in the transmit direction as well (when there is no amplification associated with the CWSS-based M×N CCMD 30B.

The channel pre-combiners 32, 34, 38, 46 act as a CCMD port multiplier. Thus, cost/port and the maximum number of ports per CWSS-based M×N CCMD 30 scales with the pre-combining. The approach can pre-combine any number of channels (e.g., 2, 3, 4, 5 . . . ) depending on the channel pre-combiners 32, 34, 38, 46. In the example shown here, the pre-combiner 32 supports 2 channels, the channel pre-combiners 34, 38 support 4 channels, and the channel pre-combiner 46 supports 6 channels. Those of ordinary skill in the art will recognize any number C, C being an integer, can be supported for pre-combining. However, routing granularity also scales with the number of pre-combined channels, the objective is in finding balance in terms of channels to the group routed. Further, as described herein, a channel is formed by a single physical optical modem 20. The optical modem 20 could support multiple wavelengths, flexible grid spectrum, advanced modulation formats, etc. That is, a port/channel represents a physical connection to the channel pre-combiners 32, 34, 38, 46 which connects to a physical port on the CWSS-based M×N CCMD 30. Of note, the systems and methods work for different baud rates (e.g., 37, 56, 75, 90 GBaud, etc.) as long as the amplifiers factor in the total power required to maintain the power spectral density.

Pre-combining more than a few channels requires amplification in order to maintain the required multiplexer and RX power spectral density. Thus, the channel pre-combiners 34, 38, 46 which all have more than a few channels (e.g., four or more channels) all have amplification. In the multiplexer direction, the amplifier 54 is on each channel port with no out-of-band ASE filtering. Accordingly, the MCS-based CCMD 18A would combine the ASE from each of the amplifiers 54 on each port of the MCS-based CCMD 18A. This makes the channel pre-combiners 32, 34, 38, 46 incompatible with any CDC architecture utilizing an MCS due to the noise funneling problem. However, the CWSS-based M×N CCMD 30 described herein removes this issue, making use of the channel pre-combiners 34, 38, 46 with amplification possible. Again, the CWSS-based M×N CCMD 30 (see FIG. 4) includes the M-array of 1×N WSS 26 which rejects the out-of-band ASE. That is, the M-array of 1×N WSS 26 has built-in filter functions to provide efficient out-of-band noise suppression to remove the multiplexer amplifier 54 Erbium Doped Fiber Amplifier (EDFA) ASE.

FIG. 6 illustrates the CWSS-based M×N CCMD 30A with the multiplexer side amplifiers 36. Here, there are the amplifiers 36 on each port from the multiplexer side of the CWSS-based M×N CCMD 30A to the corresponding degree. There are no amplifiers on the demultiplexer side from the corresponding degree. The optical modem 20A is shown directly connected to the CWSS-based M×N CCMD 30A, taking an entire CCMD port. Also, two of the optical modems 20B are connected to the CWSS-based M×N CCMD 30A via the passive channel pre-combiner 32. This is possible if the optical modem 20B output powers are sufficiently high. The amplified channel pre-combiner 34 is configured to combine the four optical modems 20C. The amplifiers 54, 56 are small amplifies for compensating coupling and splitting losses. The objective of the amplifiers 54, 56 is to maintain the same power spectral density (dBm/12.5 GHz) relative to the input and output ports of the CWSS-based M×N CCMD 30A.

FIG. 7 illustrates the CWSS-based M×N CCMD 30B with the channel amplifier 40. This is an alternative to the embodiment of FIG. 6 where the multiplexer amplifiers 36 are replaced by amplification that occurs prior to the CWSS-based M×N CCMD 30B. For the optical modems 20A, i.e., a direct modem connection to the CWSS-based M×N CCMD 30B, the channel amplifier 40 can connect to the optical modems 20. The channel amplifier 40 can be an array of individual amplifiers for each optical modem 20A. In this approach without the amplifiers on the CWSS-based M×N CCMD 30B, the channel pre-combiner 38 includes a higher gain amplifier 58 to accommodate the lack of amplifiers in the CWSS-based M×N CCMD 30B. That is, the higher gain amplifier 58 requires higher gain and power to achieve the same power spectral density at the input to the multiplexer of the CWSS-based M×N CCMD 30B.

FIG. 8 illustrates the CWSS-based M×N CCMD 30C without amplifiers therein and with the degree side amplifier module 42 on all ports. This is another embodiment where the degree side amplifier module 42 is a separate module/device from the CWSS-based M×N CCMD 30C with an amplifier in the degree side amplifier module 42 on all ports—both multiplexer and demultiplexer ports.

FIG. 9 illustrates the CWSS-based M×N CCMD 30D without amplifiers therein and with the degree side amplifier module 44 on multiplexer ports. This embodiment is similar to FIG. 8 with the degree side amplifier module 44 only having the amplifiers on the multiplexer ports. Further, this embodiment in FIG. 9 is functionally similar to the embodiment in FIG. 6 with the difference being the hardware device configuration.

FIG. 10 illustrates different variants of the channel pre-combiners 34, 46. The systems and methods contemplated various different pre-combiner modules to support C ports on the optical modem 20 side (C=2, 3, 4, . . . ) and one port on the CWSS-based M×N CCMD 30 side. Thus, the pre-combiner modules serve as a port multiplier. With the amplifiers in the channel pre-combiners, higher values of C are also contemplated, such as 16, etc.

The various devices in FIGS. 5-10 can be physically implemented in modules, cards, blades, etc. For example, the devices can be realized in so-called "pizza-box" form factors with varying heights (which are generally measured in Rack Units (RU), e.g., 1 RU, 2RU, etc.).

Referring to FIGS. 5-10, in an embodiment, the present disclosure includes an optical add/drop system supporting a colorless, directionless, and contentionless (CDC) architecture. The optical add/drop system includes a Contentionless Wavelength Selective Switch (CWSS)-based optical add/drop device, namely the CWSS-based M×N CCMD 30, with N local add/drop ports 60 and M degree ports 62; and a first channel pre-combiner, such as any of the channel pre-combiners 32, 34, 38, 46, including a common port 64 connected to a first port of the N local add/drop ports 60 and at least two local add/drop ports 66 coupled to the common port 64.

The CWSS-based optical add/drop device can include an M-array of 1×N Wavelength Selective Switches (WSSs) 26 and an N-array of M×1 switches 24. The first channel pre-combiner can be a passive device, such as the channel pre-combiner 32, which passively combines the at least two local add ports and splits the at least two local drop ports. The first channel pre-combiner can include amplifiers 54, 56, 58 on the common port 64 in both an add direction and a drop direction. The CWSS-based optical add/drop device can be configured to filter out-of-band noise in the add direction.

The at least two local add/drop ports 66 can be connected to associated optical modems 20 each of which has channels which are co-routed to a same degree by the CWSS-based optical add/drop device. The associated optical modems can provide associated channels at non-adjacent spectral locations to one another. The CWSS-based optical add/drop device can include amplifiers 36, 42, 44 at least on a multiplexer side of the M degree ports. An optical modem 20A can be directly attached to a second port of the CWSS-based optical add/drop device.

The optical add/drop system can further include a second channel pre-combiner with a common port 64 connected to a second port of the N local add/drop ports 60 and at least two local add/drop ports 66 coupled to the common port 64. The first channel pre-combiner can have a different number of local add/drop ports 66 from the second channel pre-combiner.

Again, the only limitation introduced by pre-combining is that the pre-combined channels must travel as a group, i.e., they are coupled to the same ROADM degree. The channels do not need to be adjacent in wavelength or frequency as the CWSS-based M×N CCMD 30 can be configured to co-route an arbitrary combination of wavelengths or frequencies.

An advantage of using the CWSS-based M×N CCMD 30 is that it can be configured to filter out the ASE created by the sub-tending multiplexer amplifiers 54, 58. This avoids the issue of noise funneling, which could severely impact the OSNR of the add channels. This is why this configuration would not work well if an MCS was used instead of the CWSS, since the MCS provides no optical filtering.

Using the various CDC approaches described herein with the channel pre-combiners has comparable OSNR performance or better than the CD approach. The embodiments including the amplifiers prior to the CWSS-based M×N CCMD 30B have better OSNR performance as well. Further, the channel pre-combiners bring the per-port cost close to or better than the CD approach with a slightly higher first-in cost (the cost with the first channel). The channel pre-combining allows the CDC architecture to close the gap (using 2, 3, or 4 channel pre-combiners) or significantly exceed the capacity using 6 channels or more.

Thus, the combination of a CWSS-based optical add/drop module for CDC and channel pre-combiners offer substantial scaling benefits and eliminates the need for costly and equipment intensive expansions at high-port-count ROADM nodes. The approach described herein greatly improves cost/port/GHz. The channel pre-combiners benefit from the CWSS suppressing out-of-band ASE. The multiplexer amplifiers are designed to support the increased capacity of the channel pre-combiners and maintain the required power spectral density.

Further, the CWSS-based M×N CCMD 30 can support both single channel attachment (the optical modem 20A) or various different channel pre-combiners with different values on any port. This means that adjacent ports on the CWSS-based M×N CCMD 30 can have a different number of channels, as needed. For example, if a ROADM node 10 has connectivity to another ROADM node with a significant direct channel count, a high-channel-count pre-combiner can be used between these two nodes. On the contrary, if another node only requires a single channel with the ROADM node 10, this connectivity can be the optical modem 20A connected without channel pre-combiners. That is, the channel pre-combining approach is extremely advantageous for large traffic flows between sites.

Figure 12:
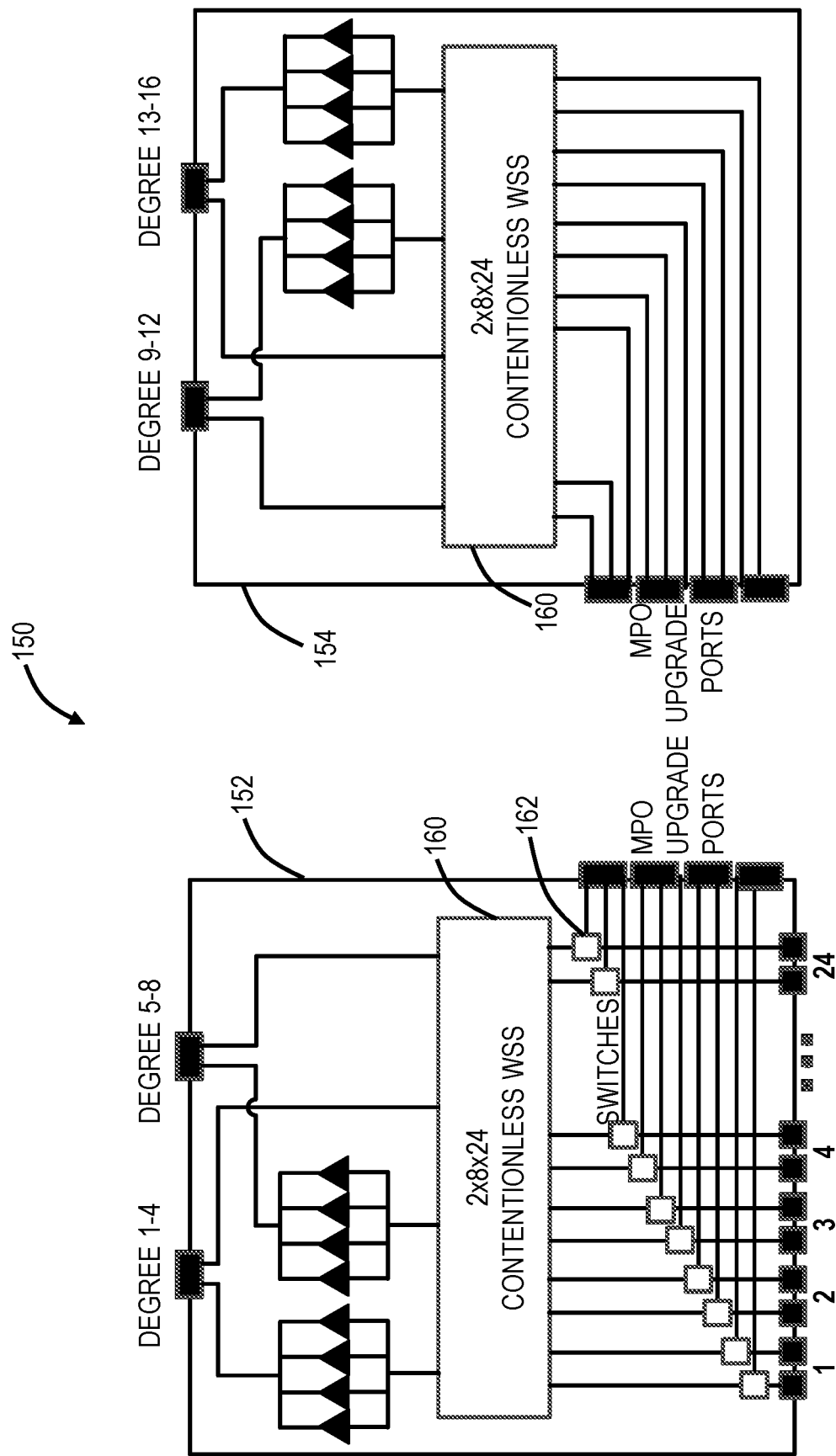
FIG. 12 is a block diagram of an example implementation of a modular optical add/drop system with a CDC architecture and with the ability to support 8 degrees initially and upgrade to 16 degrees.

FIG. 12 is a block diagram of an example implementation of an optical add/drop system 100 with a CDC architecture and with the ability to support 16 degrees. The optical add/drop system 100 can be part of the 16-degree CDC ROADM node 10A. The optical add/drop system 100 includes two 1×16×24 CWSS devices 102R, 102T (one for receive, one for transmit). As described herein, the channel pre-combiners 32, 34 can be utilized to increase the add/drop channel count with the optical add/drop system 100. The channel pre-combiners 32, 34 can be used to pre-combine inputs to create a super channel. The benefit provides increase add/drop capacity and improved per-port cost. The trade-off of the channel pre-combiners 32, 34 requires any channels be co-routed, which is a modest concession.

One disadvantage of the optical add/drop system 100 is there is a requirement to deploy the two 1×16×24 CWSS devices 102R, 102T up front ("day one") to guarantee the possible support to expand up to 16 degrees. These two 1×16×24 CWSS devices 102R, 102T are costly and network operators are not willing to deploy the optical add/drop system 100 due to this premium.

Figure 13:
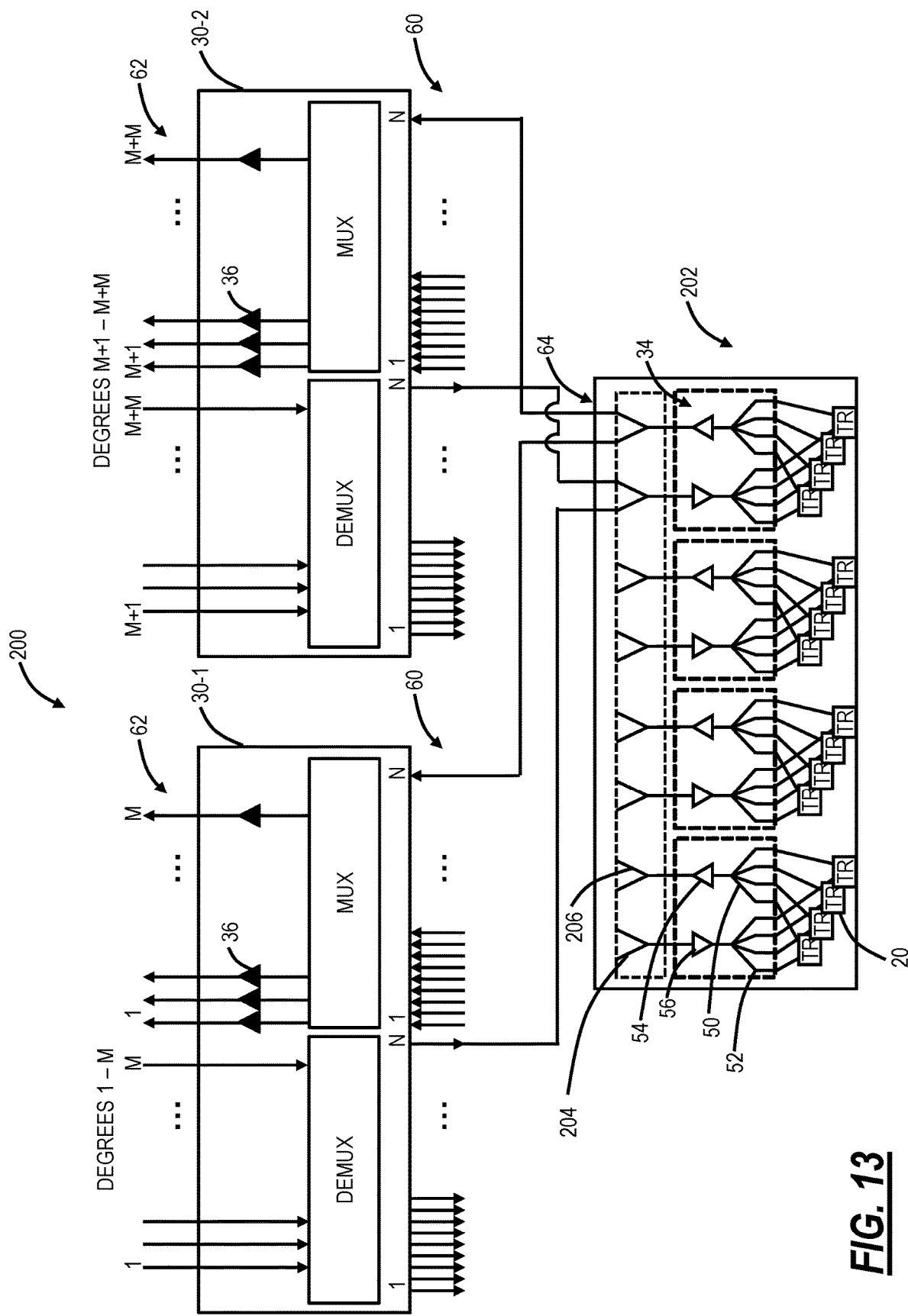
FIG. 13 is a block diagram of a modular optical add/drop system with a CDC architecture, with the ability to upgrade a number of degrees, and with a channel pre-combiner.

FIG. 13 is a block diagram of an example implementation of a modular optical add/drop system 150 with a CDC architecture and with the ability to support 8 degrees initially and upgrade to 16 degrees. Specifically, the modular optical add/drop system 150 includes two modules 152, 154 each with a 2×8×24 CWSS 160. The module 152 supports a first set of degrees, e.g., degrees 1-8, and the module 154 can be added in an upgrade to support a second set of degrees, e.g., degrees 9-16. To accomplish this upgrades, there are switches 162 which connect ports of the first module 152 to ports of the second module 154, such as via MPO upgrade ports. For example, the switches 162 in this example can include 48 MEMS switches which steer light to the module 154 where required. The modular optical add/drop system 150 solves the first-in cost of the optical add/drop system 100 as only one 2×8×24 CWSS 160 is initially required versus two 1×16×24 CWSS devices 102R, 102T. However, the modular optical add/drop system 150 with the switches 162 is also additional cost (although not as much as the optical add/drop system 100) as well as increased complexity and decreased performance.

FIG. 14 is a block diagram of a modular optical add/drop system 200 with a CDC architecture, with the ability to upgrade a number of degrees, and with a channel pre-combiner 202. The pre-combiner 34 described herein can be utilized to overcome the deficiencies of the optical add/drop system 100 and the modular optical add/drop system 150. Specifically, the channel pre-combiner 202 includes several pre-combiners 34 as described herein. Again, the channel pre-combiners 34 include couplers 50 in the transmit direction to combine the channels from the optical modems 20 before they are coupled to the CWSS-based M×N CCMD 30 (labeled as modules 30-1, 30-2 in FIG. 14). The channel pre-combiners 34 include splitters 52 in the receive direction to split the channels to the optical modems 20 from the CWSS-based M×N CCMD 30. The channel pre-combiners 34 can also include an amplifier 54 in the transmit direction and an amplifier 56 in the receive direction.

The pre-combiner 202 with the pre-combiners 34 provides upgradeability in terms of the CWSS devices deployed day one (initial) versus future. Specifically, the pre-combiner 202 includes a combiner 204 in a receive direction, prior to the amplifier 56, and a splitter 206 in a transmit direction, subsequent to the amplifier 54. The combiner 204 and the splitter 206 replace the need for the expensive and complex switches 162 in the modular optical add/drop system 150. Further, the combiner 204 and the splitter 206 are simple hardware mechanisms and result in a small inconsequential cost premium and concedes very little in terms of density or performance.

The combiner 204 and the splitter 206 are on the common port of the pre-combiner 202 to effectively broadcast the signal to two different modules 30-1, 30-2 enabling a super channel formed by each of the pre-combiners 34 to reach any one of M+M degrees. The receive side combines the output from that same module 30-1, 30-2 pair. MEMs switches on the channel port inputs and outputs (on the modules 30-1, 30-2) are used to block the connections to the unintended module 30-1, 30-2. This is effectively a broadcast and select mechanism. The splitters 206 can be used in this configuration without a large OSNR penalty because the loss occurs after the pre-combiner mux amplifier 54 (power is higher).

The modular optical add/drop system 200 includes two CWSS-based M×N CCMDs 30-1, 30-2. The CWSS-based M×N CCMD 30-1 includes 1-M degrees. The CWSS-based M×N CCMD 30-2 includes M+1-M+M degrees. In an example deployment, a node may be initially deployed with the CWSS-based M×N CCMD 30-1 to support up to M degrees and with the pre-combiner 202 with the combiners 204 and the splitters 206. The combiners 204 and the splitters 206 effectively double the common ports 64 of the pre-combiner 202.

In the initial deployment, the combiners 204 and the splitters 206 on the common ports 64 of the pre-combiner 202 are only connected to the module CWSS-based M×N CCMD 30-1. For an in-service upgrade, the CWSS-based M×N CCMD 30-2 is added and connected to corresponding ports on the combiners 204 and the splitters 206. In an embodiment, M=8 such that the CWSS-based M×N CCMD 30-1 supports 1 to 8 degrees and the CWSS-based M×N CCMD 30-2 supports 9 to 16 degrees.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising steps of:
    when a plurality of channels at a Reconfigurable Optical-Add Drop Multiplexer (ROADM) node in an optical network will ingress and egress from a degree in the optical network, such that the plurality of channels are able to share a same physical routing in the optical network because the plurality of channels are each traffic flows that originate and terminate at the ROADM node and a second ROADM node thereby providing a large traffic flow therebetween, connecting the plurality of channels at the degree in the ROADM node, such that the plurality of channels are connected to the second ROADM node in the optical network; and
    pre-combining the plurality of channels onto a common port between the degree and the corresponding modems prior to being routed through the optical network, such that the plurality of channels connect to the degree together in a single connection that is co-routed to the second ROADM node, and wherein the plurality of channels are at arbitrary spectral locations, channel bandwidth, modulation formats, or baud rates, relative to one another.

2. The method of claim 1, wherein an add/channel count of the ROADM node is higher with the pre-combining than without performing the pre-combining.

3. The method of claim 1, wherein at least two of the plurality of channels are non-adjacent to one another in optical spectrum.

4. The method of claim 1, wherein the plurality of channels are adjacent to one another in optical spectrum.

5. The method of claim 1, wherein the ROADM includes a Colorless, Directionless, and Contentionless (CDC) architecture.

6. The method of claim 1, wherein the ROADM includes one or more Contentionless Wavelength Selective Switches (CWSS).

7. The method of claim 1, wherein the steps further include
    amplifying the plurality of channels after the pre-combining.

8. The method of claim 1, wherein the plurality of channels include C channels, C being an integer greater than or equal to 4.

9. The method of claim 1, wherein the ROADM includes one or more degrees including the degree, and wherein the steps further include
    upgrading the ROADM in-service to include one or more additional degrees with one or more degrees.

10. A Reconfigurable Optical Add/Drop Multiplexer (ROADM) node comprising:
    one or more degrees; and
    one or more pre-combiners located in the signal path in-between the degree and one or more optical modems,
    wherein, when a plurality of channels will ingress and egress at the degree, such that the plurality of channels are able to share a same physical routing in the optical network because the plurality of channels are each traffic flows that originate and terminate at the ROADM node and a second ROADM node thereby providing a large traffic flow therebetween, corresponding optical modems of the one or more optical modems are connected to a pre-combiner of the one or more pre-combiners, such that the plurality of channels connect to the degree together in a single connection that is co-routed to the second ROADM node, and wherein the plurality of channels are at arbitrary spectral locations, channel bandwidth, modulation formats, or baud rates, relative to one another.

11. The ROADM node of claim 10, wherein an add/channel count of the ROADM node is higher with the one or more pre-combiners than without the one or more pre-combiners.

12. The ROADM node of claim 10, wherein at least two of the plurality of channels are non-adjacent to one another in optical spectrum.

13. The ROADM node of claim 10, wherein the plurality of channels are adjacent to one another in optical spectrum.

14. The ROADM node of claim 10, wherein the ROADM includes a Colorless, Directionless, and Contentionless (CDC) architecture.

15. The ROADM node of claim 10, wherein the degree includes one or more Contentionless Wavelength Selective Switches (CWSS).

16. The ROADM node of claim 10, further comprising
    an amplifier configured to amplifier the plurality of channels after the pre-combiner.

17. The ROADM node of claim 10, wherein the plurality of channels include C channels, C being an integer greater than or equal to 4.

18. The ROADM node of claim 10, wherein the one or more degrees are upgradeable in-service to include one or more additional degrees with one or more degrees.

* * * * *